United States Patent [19]

Seki et al.

[11] Patent Number: 5,422,820
[45] Date of Patent: Jun. 6, 1995

[54] METHOD OF DRAWING FIGURES REPRESENTING THE MACHINING OF A POLYHEDRAL WORKPIECE BASED ON NUMERICAL CONTROL DATA

[75] Inventors: Masaki Seki, Suginami; Takashi Takegahara, Hachioji; Toru Matsunaka, Yanai; Shizuaki Hayanagi, Oshino, all of Japan

[73] Assignee: Fanuc Ltd., Yamanashi, Japan

[21] Appl. No.: 207,257

[22] Filed: Mar. 8, 1994

Related U.S. Application Data

[63] Continuation of Ser. No. 778,832, filed as PCT/JP91/00579, Apr. 26, 1991, abandoned.

[30] Foreign Application Priority Data

Apr. 27, 1990 [JP] Japan .................. 2-110377

[51] Int. Cl.⁶ .......................................... G05B 19/405
[52] U.S. Cl. ................. 364/474.24; 364/474.26; 318/569
[58] Field of Search ........... 364/474.19, 474.2, 474.22, 364/474.27; 395/118, 119–121; 345/115, 118; 318/569, 570, 568.25

[56] References Cited

U.S. PATENT DOCUMENTS

| 4,788,481 | 11/1988 | Niwa | 364/474.26 |
|---|---|---|---|
| 5,010,502 | 4/1991 | Diebel et al. | 364/474.24 |
| 5,126,646 | 6/1992 | Fujita et al. | 364/474.26 |

FOREIGN PATENT DOCUMENTS

| 0121100 | 10/1984 | European Pat. Off. | 364/474.22 |
|---|---|---|---|
| 015356 | 9/1985 | European Pat. Off. | |
| 0348521 | 1/1990 | European Pat. Off. | |
| 0354971 | 2/1990 | European Pat. Off. | |
| 62-35911 | 2/1987 | Japan | |
| 62-92003 | 4/1987 | Japan | |
| 62-222306 | 9/1987 | Japan | |
| 63-118806 | 5/1988 | Japan | 364/474.22 |
| 1-206467 | 8/1989 | Japan | |

Primary Examiner—Paul P. Gordon
Assistant Examiner—Steven R. Garland
Attorney, Agent, or Firm—Staas & Halsey

[57] ABSTRACT

A data drawing method which facilitates the checking of numerical control data for a polyhedron machining and is carried out by, for example, an automatic programming system. If a drawing mode is selected in which machining profiles and tool paths related to individual machining surfaces of a polyhedral material are displayed separately on a display screen according to the machining surfaces, and if a processor of the programming system determines that NC data obtained by executing a program statement read from a part program is related to any one of the machining surfaces, drawing areas corresponding in number to the faces of the polyhedral workpiece on the display screen are displayed, and a character string representing the machining surface and a material profile in a drawing area corresponding to the machining surface are displayed. Then, machining profiles and tool paths specified by the produced NC data are displayed in the drawing area to permit the operator's visual checking. Machining profiles and tool paths related to another machining surface are displayed in a different drawing area, whereby the machining profiles and the tool paths can be easily checked.

5 Claims, 3 Drawing Sheets

METHOD OF DRAWING FIGURES REPRESENTING THE MACHINING OF A POLYHEDRAL WORKPIECE BASED ON NUMERICAL CONTROL DATA

This application is a continuation of application Ser. No. 07/778,832, filed as PCT/JP91/00579, on Apr. 26, 1991, now abandoned.

BACKGROUND OF THE INVENTION

1. Field of the Invention

This invention relates to a computer-aided design-/manufacturing (CAD/CAM) system, and more particularly, to a data drawing method which facilitates the checking of numerical control data for a polyhedron machining

2. Description of Related Art

In CAD/CAM systems including a computer for carrying out design and manufacture interactively using graphic information as a medium, various data are produced and the produced data are shown on a display screen. An automatic programming system associated with such a CAD/CAM system automatically prepares numerical control (NC) data including graphic information, on the basis of a part program including profile definitions, and also draws figures (e.g., machining profiles and tool paths) corresponding to the graphic information included in the prepared data, to permit the operator to check the NC data.

FIG. 1 (Prior Art) shows an example of drawing machining profiles and tool paths by a conventional method on the basis of NC data for making a pocket in the rear and right-hand surfaces of a hexahedral material. As shown in FIG. 1, a profile 10 of the hexahedral material is displayed in perspective on a display screen 7', and surface and bottom profiles 11a and 11b of a first pocket to be formed in the rear surface of the hexahedral material and a tool path 11c associated with the first pocket are displayed in a superposed manner on the material profile 10. Further, surface and bottom profiles 12a and 12b of a second pocket to be formed in the right-hand surface of the hexahedral material and a tool path 12c associated with the second pocket are displayed in a superposed manner on the material profile 10, first pocket profiles 11a and 11b, and tool path 11c.

In the conventional method described above, figures specified by numerical control data representing, e.g., pocket profiles (more generally, machining profiles), tool paths, etc., are shown in a superposed manner on the display screen. Accordingly, it is difficult to check the figures and, thus, the numerical control data.

DISCLOSURE OF THE INVENTION

An object of this invention is to provide a data drawing method which facilitates the checking of numerical control data for a polyhedron machining.

To achieve the above object, this invention provides a method of drawing numerical control data for a polyhedron machining, comprising the steps of: (a) determining to which one of machining surfaces of a polyhedral workpiece each of data blocks constituting numerical control data is related; and (b) drawing a group of figures including at least one figure and corresponding to at least one data block related to one machining surface in a display screen area corresponding to this machining surface.

As described above, according to this invention, it is determined to which one of machining surfaces of a polyhedral workpiece each of data blocks of numerical control data for a polyhedron machining is related, and a group of figures corresponding to at least one data block related to one machining surface is drawn in a display screen area corresponding to this machining surface. Accordingly, figure groups related to the respective machining surfaces of the polyhedral workpiece are displayed separately on the display screen, whereby the operator can easily determine whether or not each of the figure groups is identical to an intended one, and thus, the numerical control data for polyhedron machining can be checked easily.

DETAILED DESCRIPTION OF THE PREFERRED EMBODIMENTS

Figure 2:
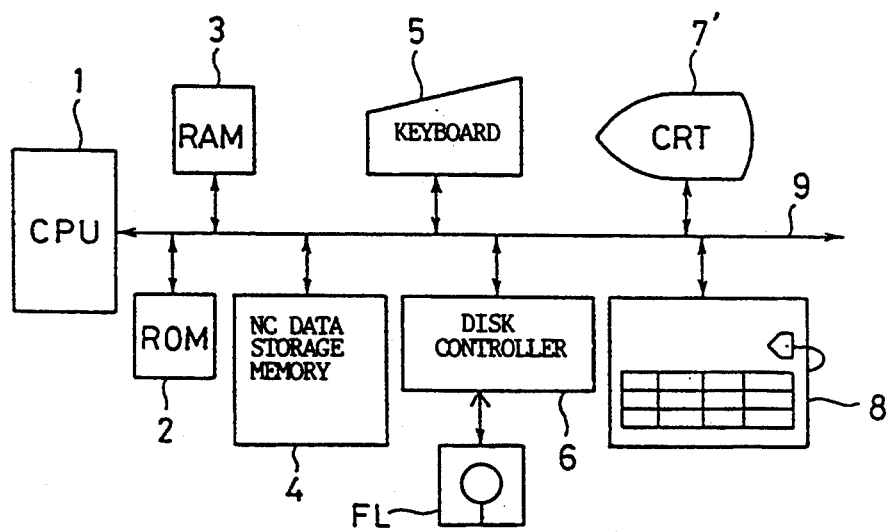
FIG. 2 is a block diagram schematically illustrating an automatic programming system for carrying out this invention.

Referring to FIG. 2, an automatic programming system comprises a processor 1, a read-only memory (ROM) 2 storing a program for controlling the programming system, and a random-access memory (RAM) 3 for temporarily storing a system program, a part program, operation results from the processor, etc. The programming system further comprises a memory 4 formed by a nonvolatile RAM for storing prepared NC data, a keyboard 5, a disk controller 6 for receiving a floppy disk FL, a display device (CRT) 7 having a CRT screen, and a tablet 8. The elements 2 to 8 are connected to the processor 1 by a bus 9. A paper tape reader (not shown) for reading a part program recorded in a paper tape (not shown) may be provided, if necessary.

The keyboard 5 includes character keys, number keys, various command keys and function keys, and permits various commands, character data, and numeric data to be input to the processor 1 in accordance with an operator's key-in operation. The tablet 8 includes a tablet menu for displaying various commands and a tablet cursor, and a command specified on the tablet menu through an operator's operation of the tablet cursor is input to the processor 1.

The programming system loads, into the RAM 3, a part program prepared by the operator by the use of the keyboard 5, CRT 7 and tablet 8, a part program previously produced and recorded on the floppy disk FL or in the paper tape, and the system program stored in the floppy disk.

The part program is used for automatically preparing numerical control data (machining program) for a polyhedron machining by means of the programming system, and consists of a plurality of program statements. The part program includes a definition statement specifying the profile of a polyhedral material, codes representing respective faces of the material to be machined, and profile definitions specifying the machining profiles for the respective faces to be machined. In this embodiment, a selection between a first drawing mode and a second drawing mode is available; in the first drawing mode, a plurality of sets of machining profiles and tool paths relating to the respective surfaces to be machined (more generally, a plurality of figure groups each including at least one figure) are drawn in respective different areas of the display screen, and in the second drawing mode, a plurality of sets of machining profiles and tool paths are drawn in one display area of the display screen. To this end, the system program includes a process for displaying an interrogatory message requesting a selection of one of the drawing modes on the CRT screen, and a process for drawing groups of figures on the CRT screen in accordance with the selected mode.

Figure 3:
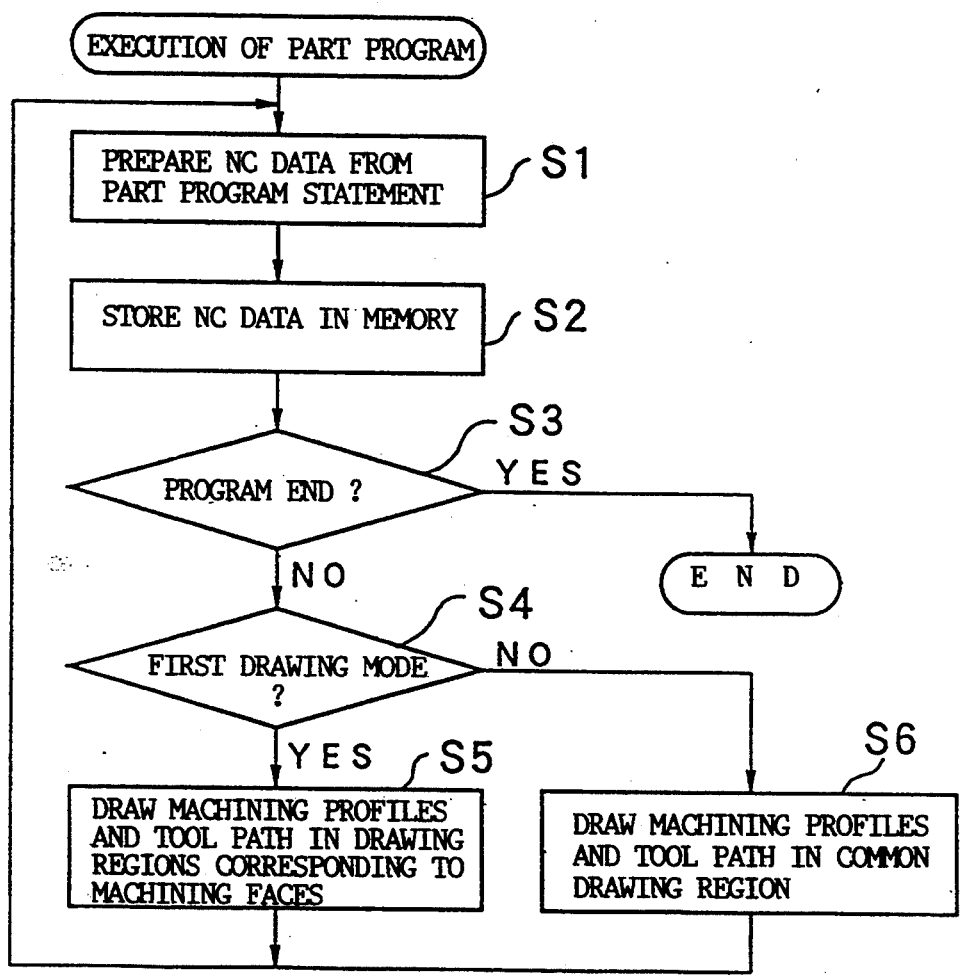
FIG. 3 is a flowchart of a part program execution process executed in a drawing method according to one embodiment of this invention.

The operation of the programming system shown in FIG. 3 will be now described.

When the programming system is started, the processor 1 loads the part program and the system program into the RAM 3 in accordance with the control program stored in the ROM 2. Then, the processor 1 controls the CRT 7 in accordance with the system program, to display the interrogatory message requesting a selection of the first or second drawing mode on the CRT screen. The operator selects the first or second drawing mode, using the keyboard 5 or the tablet 8, and inputs a part program analysis execution command through the keyboard 5. Thereupon, the processor 1 stores mode information representing the selected drawing mode in a built-in register thereof, and starts a part program execution process shown in FIG. 3.

First, the processor 1 reads the first program statement (data block) of the part program stored in the RAM 3, analyzes and executes the statement to produce NC data corresponding to the first program statement (Step S1). The processor 1 then stores the produced NC data in the memory 4 (Step S2), and determines whether or not this NC data indicates a program end (Step S3). The first program statement and the NC data corresponding thereto usually do not indicate a program end, and therefore, the program proceeds to Step S4 in which a determination is made based on the mode information as to whether the first or second drawing mode is selected (Step S4). If it is determined that the first drawing mode is selected, the processor 1 controls the CRT 7 in accordance with the system program such that the machining profiles and tool paths specified by the NC data produced in Step S2 are drawn in the first drawing mode.

Figure 4:
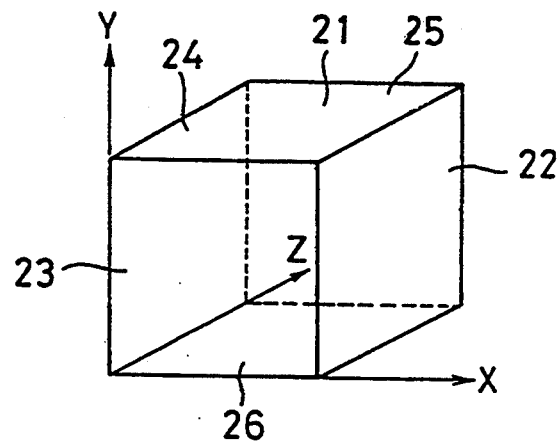
FIG. 4 is a diagram showing a drawing coordinate system used in the process shown in FIG. 3.

More specifically, the processor 1 first determines based on the material profile definition statement in the part program how many faces the material consists of. In this embodiment, a hexahedral material is used, and thus, it is determined that the material has six faces. An XYZ coordinate system for representing the material profile is preset as shown in FIG. 4, for example. Namely, X and Y axes of the XYZ coordinate system coincide with horizontal and vertical axes of the front face of the material, respectively, and a Z axis is at right angles to both the X and Y axes. In FIG. 4, reference numerals 21 to 28 denote a rear face, a right-hand face, a front face, a left-hand face, an upper face, and a bottom face of the material, respectively.

Figure 5:
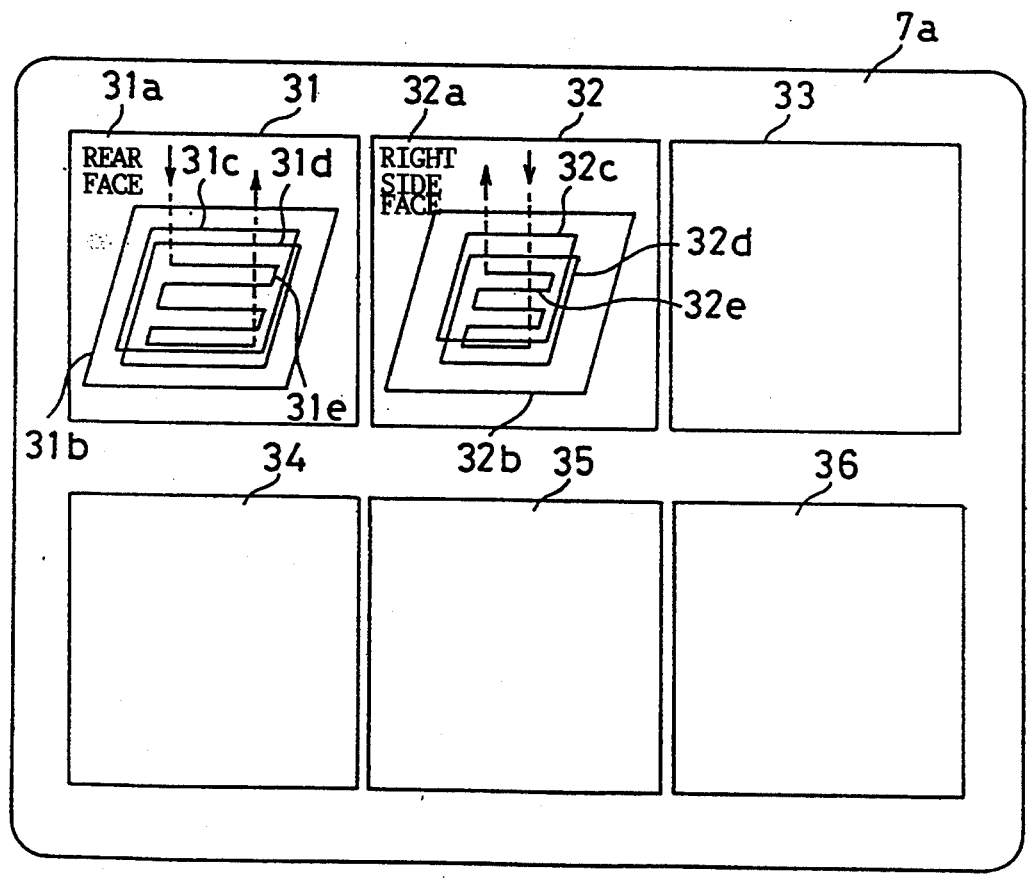
FIG. 5 is a diagram showing an example of drawing machining profiles and tool paths by the process shown in FIG. 3

Subsequently, the processor 1 displays first to sixth drawing areas 31 to 38 corresponding respectively to the six faces of the material separately on the CRT screen 7a, as shown in FIG. 5. Horizontal axes of the first and third drawing areas 31 and 33 associated respectively with the rear and front faces 21 and 23 of the material correspond to the X axis of the XYZ coordinate system shown in FIG. 4, and vertical axes of the areas 31 and 33 correspond to the Y axis of same. Horizontal axes of the second and fourth drawing areas 32 and 34 associated respectively with the right- and left-hand faces 22 and 24 of the material correspond to the Z axis, and vertical axes of the areas 32 and 34 correspond to the Y axis. Further, horizontal axes of the fifth and sixth areas 35 and 36 associated with the upper and bottom faces 25 and 26 correspond to the X axis, and vertical axes of the areas 35 and 36 correspond to the Z axis.

If a code specifying a particular face, e.g., the rear face, of the hexahedral material as a surface to be subjected to pocketing (hereinafter referred to as machining surface) is contained in the first program statement read in Step S1, the processor 1 controls the CRT 7 to display the character string "REAR FACE", corresponding to this code and indicated at 31a, in the upper left corner of the first drawing area 31 of the CRT screen 7a. The processor 1 then determines the profile of the rear face of the material on the basis of the material profile definition statement in the part program, and carries out a coordinate transformation process on the rear-face profile of the material using a coordinate transformation matrix produced previously. Due to the coordinate transformation process, the rear-face profile of the material is rotated by a first predetermined angle about the horizontal axis of the drawing area, and further rotated by a second predetermined angle about an axis perpendicular to both the horizontal and vertical axes. The processor 1 then controls the CRT 7 to draw the rear-face profile 31b of the material, which has been subjected to the coordinate transformation process, in the first drawing area 31. Next, the processor 1 determines the surface and bottom profiles of a pocket to be formed in the rear surface of the material (more generally, a machining profile or a part thereof) on the basis of the profile definition described in the first program statement, determines the tool path associated with the pocketing, and subjects the pocket profiles and tool path to the aforementioned coordinate transformation process. The surface and bottom profiles 31c and 31d of the pocket and the tool path 31e, which have been subjected to the coordinate transformation process, are drawn in the first drawing area 31 of the CRT 7 in a superposed manner on the rear-face profile 31b of the material, under the control of the processor 1. As a result, the pocket profiles 31c and 31d and the tool path 31e are displayed three-dimensionally in relation to the rear-face profile 31b of the material for visual checking by the operator.

After the drawing step S5 described above is executed, the part program execution process for a next cycle is carried out. If a program statement read in Step S1 of this cycle contains a code specifying the right-hand face of the material as a machining surface, the processor 1 displays the character string "RIGHT-HAND FACE", corresponding to this code and indicated at 32a, in the second drawing area 32. Subsequently, the profile of the right-hand face of the material is subjected to the coordinate transformation process, and the thus-processed profile 32b of the right-hand face of the material is drawn in the second area 32.

Further, the surface and bottom profiles of a pocket to be formed in the right-hand face of the material and the tool path are subjected to the coordinate transformation process, and the pocket profiles 32c and 32d and the tool path 32e obtained by the coordinate transformation process are drawn in the second area 32.

If it is determined in Step S3 of a later cycle that a program end is dictated, the part program execution process shown in FIG. 3 is ended.

Figure 1:
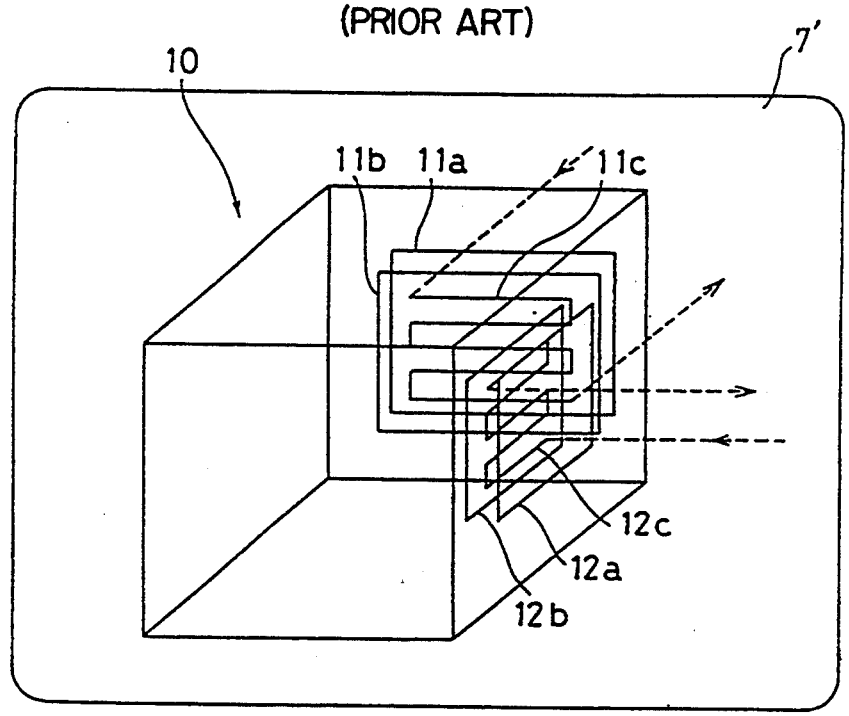
FIG. 1 is a diagram showing an example of drawing machining profiles and tool paths by a conventional method on the basis of numerical control data for making pockets in a hexahedral material.

If it is determined in Step S4 of the first cycle of the part program execution process that the second drawing mode is selected, the CRT 7 displays the pocket profiles and the tool paths in the second drawing mode, under the control of the processor 1. In this case, unlike the first drawing mode in which the first to sixth drawing areas 31 to 36 are dividedly displayed on the CRT screen 7a, a single drawing area is displayed on the CRT screen 7a. Namely, as shown in FIG. 1, the material profile, the pocket profiles in the rear surface of the material and the tool path therefor, as well as the pocket profiles in the right-hand surface of the material and the tool path therefor are displayed in the single drawing area.

This invention is not limited to the above-described embodiment and various modifications are possible.

For example, although in the embodiment, the rear surface and right-hand surface of a hexahedral material are subjected to pocketing, this invention can be applied to a machining operation other than pocketing to be performed on one or more arbitrary surfaces of a polyhedral material other than a hexahedral material. Further, in the foregoing embodiment, the number of drawing areas displayed on the display screen is equal to the number of faces of a polyhedral material, but the number of drawing areas may be equal to the number of machining surfaces. Moreover, a group of figures to be drawn is not limited to the machining profile and the tool path. Particularly, it is not essential to draw the machining profile and tool path obtained by the coordinate transformation process. Furthermore, it is not essential to enable figure groups to be drawn in a desired one of the first and second drawing modes, and providing the first drawing mode alone suffices. Moreover, in the embodiment, the method of this invention is carried out by using an automatic programming system, but it may be carried out by using various systems having a numerical control data producing function and a data drawing function.

We claim:

1. A method of displaying figures representing the machining of a polyhedral workpiece based on numerical control data including a plurality of data blocks, comprising the steps of:
   (a) determining to which one of machining surfaces of said polyhedral workpiece correspond respectively to each of said data blocks of said numerical control data;
   (b) providing separate areas on a display screen each respectively corresponding to each of said determined machining surfaces; and
   (c) displaying at least one machining figure in each of said provided separate areas on said display screen.

2. A method according to claim 1, further comprising the steps of:
   (d) executing a part program including a plurality of program statements; and
   (e) producing said data blocks of said numerical control data for each of said program statements.

3. A method according to claim 2, wherein said determining step (a) determines whether or not each of said program statements includes a code specifying one of said machining surfaces.

4. A method according to claim 1, wherein said providing step (b) includes the step of dividing said display screen into a number of said separate areas equal to or greater than a total number of machining surfaces of said polyhedral workpiece.

5. A method according to claim 1, wherein said at least one machining figure includes at least one of a machining profile and a tool path.

* * * * *